United States Patent [19]

Mordoch

[11] Patent Number: 5,097,626
[45] Date of Patent: Mar. 24, 1992

[54] AUTOMATIC SELF-WATERING SYSTEM FOR PLANTS GROWING IN A CONTAINER

[75] Inventor: Yakov Mordoch, Givhat Haradar, Israel

[73] Assignee: Hygrotek Corporation, Cambridge, Md.

[21] Appl. No.: 505,659

[22] Filed: Apr. 6, 1990

[51] Int. Cl.⁵ ............................................. A01G 27/00
[52] U.S. Cl. ......................................... 47/79; 47/48.5
[58] Field of Search ....................... 47/48.5, 66, 67, 72, 47/79, 59

[56] References Cited

U.S. PATENT DOCUMENTS

| | | | |
|---|---|---|---|
| 1,231,976 | 7/1917 | Weitzel | 47/79 |
| 3,758,987 | 9/1973 | Crane, Jr. | 47/80 |
| 4,087,938 | 5/1978 | Koch | 47/48.5 |
| 4,121,608 | 10/1978 | MacLeod | 47/79 X |
| 4,300,309 | 11/1981 | Mincy | 47/48.5 |
| 4,336,666 | 6/1982 | Caso | 47/48.5 |
| 4,782,627 | 11/1988 | Hauk | 47/48.5 X |
| 4,805,342 | 2/1989 | Jenkins et al. | 47/79 |

Primary Examiner—Richard E. Chilcot, Jr.
Assistant Examiner—Joanne C. Downs
Attorney, Agent, or Firm—Fleit, Jacobson, Cohn, Price, Holman & Stern

[57] ABSTRACT

An automatic self-watering system for plants growing in a container includes a water receptacle above the level of growing medium in the container. The water container may be of any appropriate shape, and may be attached to or located adjacent an upper edge of the container. Alternatively, the water container may have legs resting on or inserted in the growing medium, or may be hooked onto the edge of the container. The water receptacle may be formed separately from or integrally with the container. A conduit for transporting water is connected to an outlet in the side or base of the water receptacle and the conduit is engaged with a dryness sensor inserted in the growing medium in the container. The dryness sensor automatically closes the conduit when the growing medium is adequately irrigated, and opens the conduit to allow water to drip onto the growing medium when water is needed. The outlet from the conduit is positioned so that water drips, by gravity, onto the root area around a plant growing in the container. The container may also be used for holding a separate pot for a plant which fits in the container.

20 Claims, 2 Drawing Sheets

AUTOMATIC SELF-WATERING SYSTEM FOR PLANTS GROWING IN A CONTAINER

FIELD OF THE INVENTION

The invention relates to automatic self-watering systems for plants growing in containers, such as plant pots.

BACKGROUND OF THE INVENTION

Known self-watering systems for plants grown in pots do not encourage optimum root development in the plants. Baumgartner et al., U.S. Pat. No. 4,819,375, describes a receptacle for plants having a water-permeable membrane forming the base of the pot. Water enters the plant pot through the membrane, from a reservoir surrounding the pot. In use, the device of Baumgartner et al. is filled with water to a depth depending on the desired wetness of the growing medium.

Biancardi, U.S. Pat. No. 4,315,599, describes an apparatus which is supported outside the plant container. The soil dryness in the root area is measured using an electrically operated probe in the root area. A thermocouple connected to the probe controls a condensation system which allows water to drip onto the soil.

The patent to Crane, Jr., U.S. Pat. No. 3,758,987, describes a system in which water enters the pot through a permeable membrane in the base of the pot. The water is stored in a reservoir surrounding the sides of the pot and is allowed to seep into the soil when air contained in the soil indicates soil dryness.

Benesch, U.S. Pat. No. 3,512,712, describes an automatic watering device in which soil dryness is indicated by expansion and contraction of a series of wooden blocks linked to an electric switch which controls the water supply valve. Water is allowed to flow when the wooden blocks are in a contracted state.

SUMMARY OF THE INVENTION

An automatic self-watering system for plants growing in a container includes a water receptacle above the level of growing medium in the container. The water container may be of any appropriate shape, and may be attached to or located adjacent an upper edge of the container. Alternatively, the water container may have legs resting on or inserted in the growing medium, or may be hooked onto the edge of the container. The water receptacle may be formed separately from or integrally with the container. A conduit for transporting water is connected to an outlet in the side or base of the water receptacle and the conduit is engaged with a dryness sensor inserted in the growing medium in the container. The dryness sensor automatically closes the conduit when the growing medium is adequately irrigated, and opens the conduit to allow water to drip onto the growing medium when water is needed. The outlet from the conduit is positioned so that water drips, by gravity, onto the root area around a plant growing in the container. The container may also be used for holding a separate pot for a plant which fits in the container.

It is an object of the invention to provide an automatic self-watering system for plants in a container.

It is a further object of the invention to optimize the efficiency of plant watering.

DETAILED DESCRIPTION OF THE INVENTION

An automatic self-watering system of the invention preferably uses a dryness sensor disclosed in International Patent Application No. PCT-EP85/00559, filed Oct. 23, 1985, issued as European Patent No. 85905792.9. The disclosure of that patent is incorporated herein by reference, in its entirety.

Figure 2:
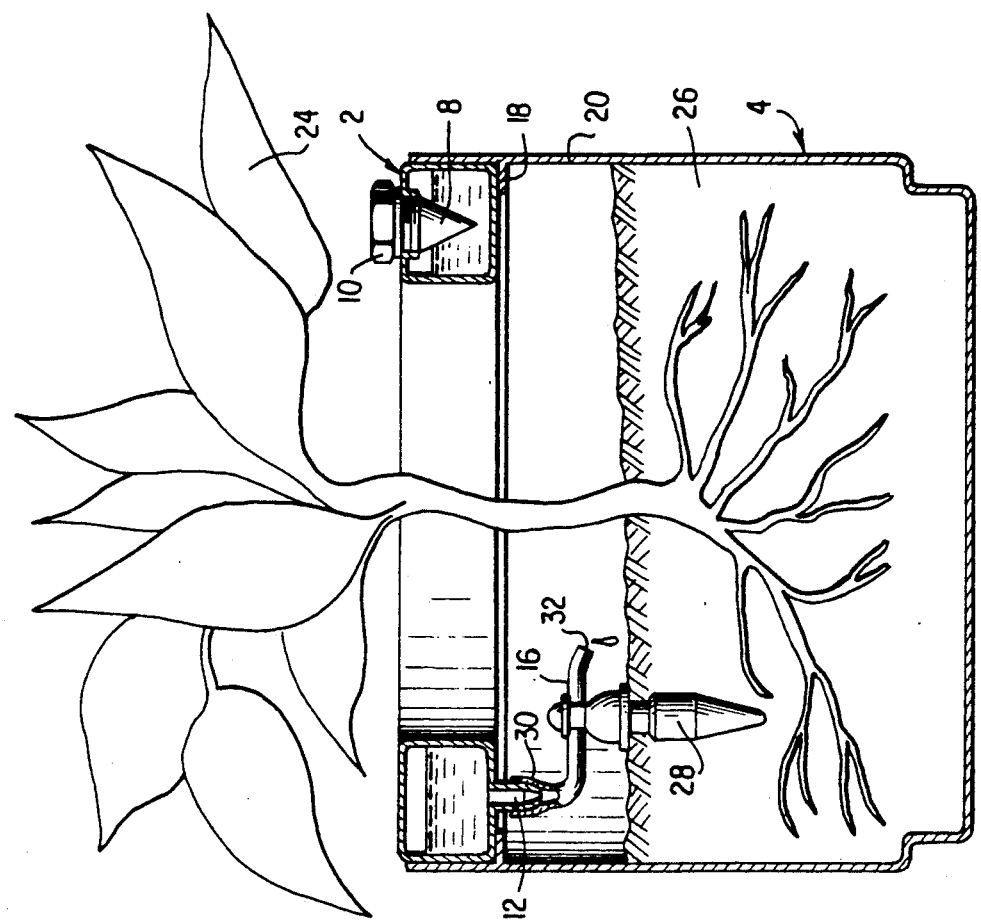
FIG. 2 is an elevational view, partly in cross-section, of the system of FIG. 1.
Figure 1:
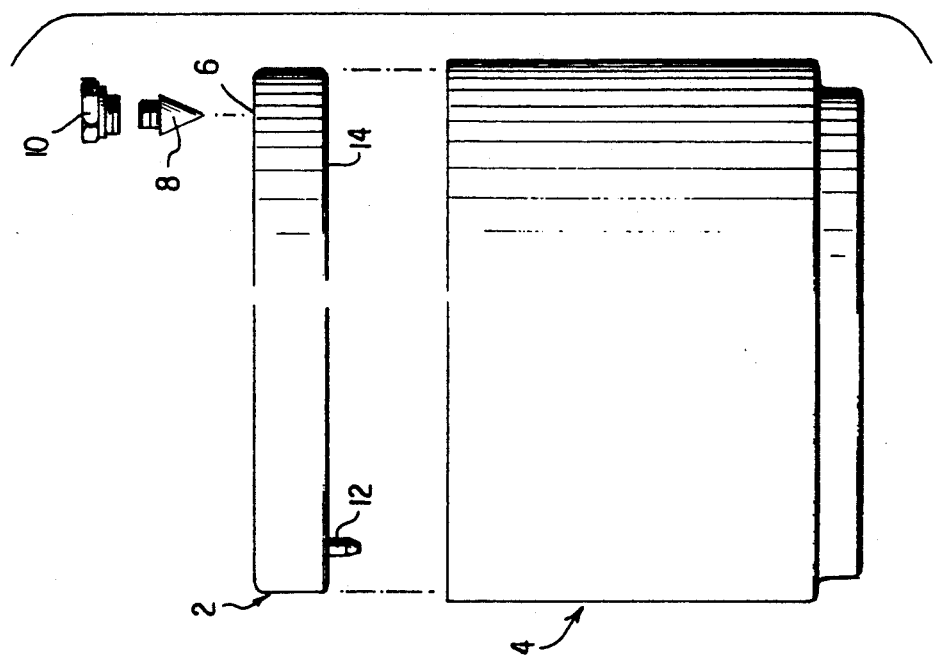
FIG. 1 is an exploded view showing the outside of an automatic self-watering system of the invention.

An automatic self-watering system for plants growing in a container is illustrated in FIGS. 1 and 2. With reference to the Figures, in which like numerals represent like parts, FIG. 1 shows an exploded view of an automatic self-watering system of the invention in which water receptacle 2 is shown separated from container 4 which holds the growing medium. Annular water receptacle 2 has a water inlet 6 in its upper surface which receives water level sight device 8 and screw cap 10. Cap 10 may optionally include a transparent window for viewing the water level in receptacle 2 through transparent sight device 8. When the water level in receptacle 2 appears low, cap 10 and sight device 8 are removed and the water in receptacle 2 is refilled. Alternatively, sight device 8 may be omitted and the water level is viewed directly. Water outlet 12, which may be a spout in base 14 of receptacle 2, allows water to flow from receptacle 2 through conduit 16, as needed.

FIG. 2 shows an assembled system of an annular water receptacle 2 together with a container 4. Receptacle 2 rests on ledge 18 which extends from the upper portion of sidewall 20 of container 4. Ledge 18 either encircles pot 4 or is a series of separate ledges spaced apart around the pot sufficient for supporting the water receptacle. In an alternative embodiment, water receptacle 2 and sidewall 20 may be joined together, either adhesively or by integrally molding water receptacle 2 with container 4.

Annular water receptacle 2 preferably extends around an upper edge 22 of container 4 and is substantially concealed in the rim of container 4. In a preferred embodiment, receptacle 2 is formed separately from container 4, so that water receptacle 2 may be removed for filling or cleaning or for other purposes, as required. When receptacle 2 and container 4 are integrally molded, sufficient access is provided for accomplishing these tasks since relatively wide central access to the container is provided. Plant 24 (or multiple plants) may be planted directly in growing medium 26, such as soil, or may be planted in a separate pot which fits inside container 4. Water receptacle 2 may be refilled in place.

Figure 3:
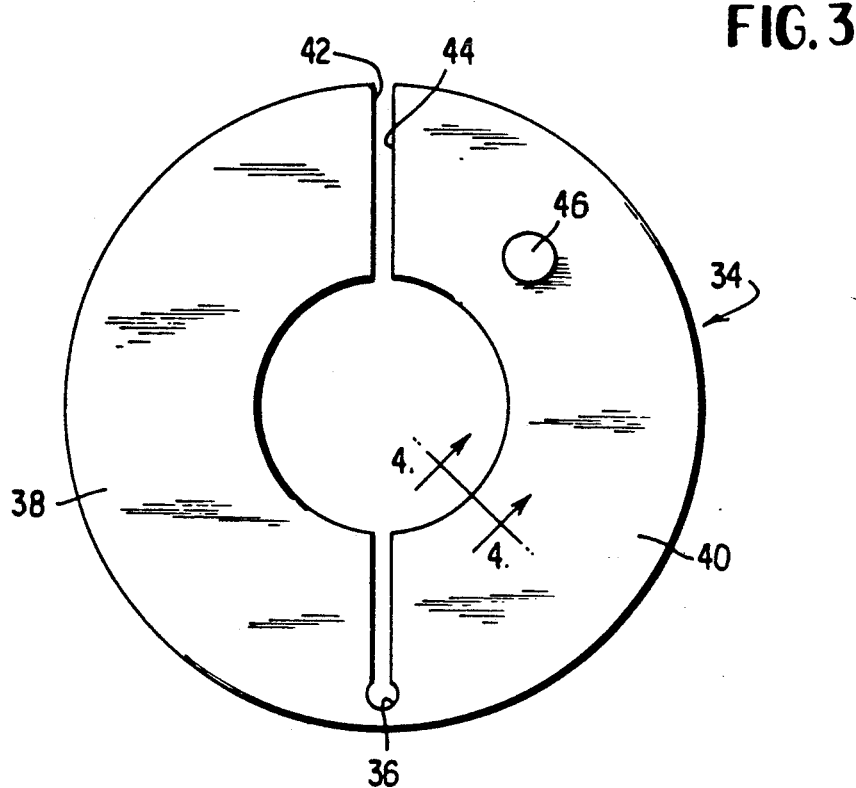
FIG. 3 is a top view of another water receptacle of the invention.
Figure 4:
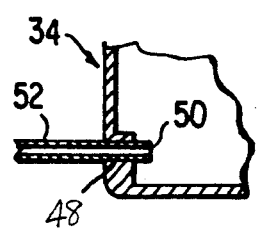
FIG. 4 is a cross-sectional view taken on line 4—4 of FIG. 3.

FIG. 3 shows an alternative embodiment of a water receptacle for use on a round plant container. Water receptacle 34 has a flexible hinge portion 36 which allows portions 38 and 40 to be separated and fitted around a plant already growing in a pot. Ends 42 and 44 may optionally be connected by a clip, known in the art. The filler cap may be any appropriate cap, such as cap 10, shown in FIGS. 1 and 2, or a plastic cap 46, which closes an opening in receptacle 34. The water level in the receptacle is observed by removing the cap. A sight device is optional. FIG. 4 shows an alternative outlet 48 for receiving an end of a water conduit. End 50 of conduit 52 is friction fitted into outlet 48 and conduit 52 leads to the sensor, as shown in FIG. 2.

Figure 5:
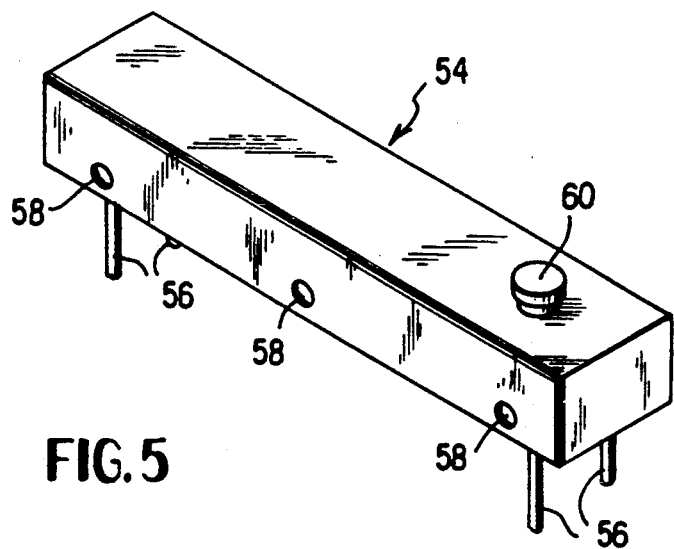
FIG. 5 is a perspective view of another water receptacle of the invention.

FIG. 5 illustrates a further embodiment of the invention. The system described may equally be used for patio containers, window boxes, garden planters and other larger containers. A typical larger installation is shown in FIG. 5 in which water receptacle 54 is supported above the growing medium by legs 56. Outlets 58 are each connected to a sensor, as described above. The container is refilled through water inlet 60.

It will be apparent to those skilled in the art that water receptacle 2, shown in FIG. 1 or water receptacle 34, shown in FIG. 3 may be supported by legs, as shown for water receptacle 54, in FIG. 5.

Dryness sensor 28, described in European Patent No. 85905792.9, discussed above, is inserted into growing medium 26 and constantly monitors the moisture or dryness of the soil. When dryness is sensed, water automatically drips through conduit 16 onto the soil in the container, as needed.

End 30 of conduit 16 is attached to outlet 12 of water receptacle 2 and an intermediate portion of conduit 16 is held and crimped by sensor 28, in normally closed condition. End 32 of conduit 16 extends sufficiently from sensor 28 so that water drips, like rain, onto the soil in the area of the roots of the plant or plants growing in container 4 when conduit 16 is in open condition.

When dryness in growing medium 26 is sensed, sensor 28 creates a variable vacuum. This activates a control diaphragm which releases pressure on conduit 16 and water is allowed to drip from receptacle 2 through conduit 16 into growing medium 26. When growing medium 26 is adequately moist, sensor 28 reads the change in moisture content and the diaphragm closes to crimp conduit 16 into closed condition. Alternatively, other sensors may be used to sense the dryness of the soil.

Water from conduit 16 preferably drips onto the root area of plant 24 and allows the roots to grow optimally, by expanding in all directions. The growing medium does not become saturated with water, due to overwatering, and is not allowed to get too dry, due to underwatering. In a non-limiting example, receptacle 2 may hold up to about 1700 cc. of water, which may be sufficient water for 4-6 weeks, depending on the size of pot and plant. Water is added to receptacle 2 by removing screw cap 10 and water level sight device 8. Water is replaced in receptacle 2 through inlet 6. Plant fertilizer, preferably in liquid form, may be mixed with the water in receptacle 2, thus maximizing plant nutrition and plant health.

Water receptacle 2 and container 4 may be made of molded plastic, metal, or other sturdy but relatively lightweight materials, known in the art. Container 4 may be decorated and/or colored appropriately. Conduit 16 is preferably a flexible plastic tube. Water spillage is avoided.

While the invention has been described with respect to certain embodiments thereof, variations and modifications may be made without departing from the spirit and scope of the invention.

What is claimed is:

1. An automatic self-watering system for plants growing in growing medium in a container comprising:
   receptacle means for holding water being supported in a position above the level of growing medium in a container for growing plants,
   sensor means for creating a variable vacuum for sensing dryness in the growing medium; and
   conduit means for conducting water from said receptacle means to the growing medium in response to sensed dryness of the growing medium sensed by creation of a vacuum in said sensor means.

2. An automatic self-watering system according to claim 1 wherein said receptacle means comprises an outlet for water in a lower portion thereof.

3. An automatic self-watering system according to claim 2 wherein an end of said conduit means is attached to said outlet.

4. An automatic self-watering system according to claim 3 wherein said conduit means is supported by said sensing means.

5. An automatic self-watering system according to claim 2 wherein said receptacle means comprises means for determining water level in said receptacle means.

6. An automatic self-watering system according to claim 1 wherein said receptacle means further comprises means for being supported above the level of the growing medium.

7. An automatic self-watering system according to claim 6 wherein said supporting means comprises a plurality of legs.

8. An automatic self-watering system according to claim 1 wherein said receptacle means comprises a plurality of outlets each connected to a separate sensing means.

9. An automatic self-watering system according to claim 1 further comprising a container for holding growing medium.

10. An automatic self-watering system according to claim 9 wherein said receptacle means is formed integrally with said container.

11. An automatic self-watering system according to claim 10 wherein said receptacle means comprises an upper edge of said container.

12. An automatic self-watering system for plants growing in a container comprising:
    a container for holding growing medium for plants;
    receptacle means for containing water for irrigating the plant, said receptacle means being supported in a position above the level of growing medium in the container;
    sensor means inserted in the growing medium for creating a variable vacuum for sensing dryness of the growing medium;
    conduit means engaged with said sensing means for conducting water from an outlet in said receptacle means to the growing medium in response to sensed dryness of the growing medium sensed by creation of a vacuum in said sensor means.

13. An automatic self-watering system according to claim 12 wherein said container and said receptacle means are formed separately.

14. An automatic self-watering system according to claim 13 wherein said receptacle means is located substantially adjacent an upper edge of said container.

15. An automatic self-watering system according to claim 14 wherein said container further comprises means for supporting said receptacle means.

16. An automatic self-watering system according to claim 15 wherein said supporting means comprises a ledge extending from an inner wall of said container.

17. An automatic self-watering system according to claim 16 wherein said ledge extends from an upper portion of the inner wall of said container.

18. An automatic self-watering system according to claim 12 wherein said receptacle means further comprises means for determining water level in said receptacle means.

19. An automatic self-watering system according to claim 12 wherein said receptacle means is formed integrally with said container.

20. An automatic self-watering system according to claim 19 wherein said receptacle means comprises an upper edge of said container.

* * * * *